United States Patent
Lee et al.

(10) Patent No.: US 6,956,829 B2
(45) Date of Patent: Oct. 18, 2005

(54) APPARATUS AND METHOD FOR MEASURING PROPAGATION DELAY IN AN NB-TDD CDMA MOBILE COMMUNICATION SYSTEM

(75) Inventors: Hyun-Woo Lee, Suwon-shi (KR); Sung-Ho Choi, Songnam-shi (KR); Kook-Heui Lee, Songnam-shi (JP); Byung-Jae Kwak, Songnam-shi (KR); Do-Young Kim, Seoul (KR); Sung-Oh Hwang, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 867 days.

(21) Appl. No.: 09/989,233

(22) Filed: Nov. 19, 2001

(65) Prior Publication Data

US 2002/0131379 A1 Sep. 19, 2002

(30) Foreign Application Priority Data

| Nov. 17, 2000 | (KR) | ......................................... 2000-69372 |
| Nov. 23, 2000 | (KR) | ......................................... 2000-71084 |
| Nov. 24, 2000 | (KR) | ......................................... 2000-70556 |

(51) Int. Cl.$^7$ ................................................. H04Q 7/38
(52) U.S. Cl. ........................ 370/280; 370/335; 370/342
(58) Field of Search ............................... 370/276, 277, 370/280, 310, 328, 329, 335, 342, 350

(56) References Cited

FOREIGN PATENT DOCUMENTS

| DE | 100 08 653 A1 | 9/2001 |
| WO | WO 01/67620 A3 | 9/2001 |
| WO | WO 01/67620 A2 | 9/2001 |

OTHER PUBLICATIONS

3G TR 25.928, *1.28 Mcps Functionality for UTRA TDD Physical Layer*, Jul. 1, 2000, pp 82–85.

3GPP TS 25.435, *Utran Iub Interface User Plane Protocols for Common Transport Channel Data Streams*, Sep. 1, 2000, p 15.

ETSI TR 125.937, 3GPP TR 25.937, *Low Chip Rate TDD Iub/Iur Protocol Aspects*, Mar. 1, 2001, pp 23–28.

*Primary Examiner*—Chi Pham
*Assistant Examiner*—Derrick W Ferris
(74) *Attorney, Agent, or Firm*—Dilworth & Barrese LLP (57) ABSTRACT

Disclosed is a method for measuring a propagation delay value of a frame transmitted by a UE (User Equipment) to a Node B in a TDD (Time Division Duplexing) mobile communication system. The UE acquires synchronization with the Node B based on a downlink pilot channel signal transmitted in a period of a downlink pilot time slot, and determines an estimated round trip delay value T1 by comparing transmission power of a physical common channel signal in a first time slot with reception power of the same signal. The UE receives a transmission point correcting value T2 through a forward physical access channel (FPACH) signal transmitted from the Node B in a period of one downlink time slot among the time slots, and transmits a physical random access channel (PRACH) message with the estimated round trip delay value T1 at a transmission point determined based on T2 and T1.

26 Claims, 7 Drawing Sheets

APPARATUS AND METHOD FOR MEASURING PROPAGATION DELAY IN AN NB-TDD CDMA MOBILE COMMUNICATION SYSTEM

PRIORITY

This application claims priority to an application entitled "Apparatus and Method for Measuring Propagation Delay in an NB-TDD CDMA Mobile Communication System" filed in the Korean Industrial Property Office on Nov. 17, 2000 and assigned Serial No. 2000-69372, an application entitled "Apparatus and Method for Measuring Propagation Delay in an NB-TDD CDMA Mobile Communication System" filed in the Korean Industrial Property Office on Nov. 24, 2000 and assigned Serial No. 2000-70556, and an application entitled "Apparatus and Method for Measuring Propagation Delay in an NB-TDD CDMA Mobile Communication System" filed in the Korean Industrial Property Office on Nov. 23, 2000 and assigned Serial No. 2000-71084, the contents of all of which are hereby incorporated by reference.

BACKGROUND OF THE INVENTION

1. Field of the Invention

The present invention relates generally to an apparatus and method for measuring propagation delay in a CDMA (Code Division Multiple Access) mobile communication system, and in particular, to an apparatus and method for measuring propagation delay in an NB-TDD (Narrow Band Time Division Duplexing) CDMA mobile communication system.

2. Description of the Related Art

In general, a CDMA mobile communication system is classified into an FDD (Frequency Division Duplexing) system for separating a transmission frequency and a reception frequency on a frequency division basis, and a TDD (Time Division Duplexing) system for separating a downlink channel and an uplink channel on a time division basis. Specifically, the TDD system designates a plurality of slots constituting one frame as slots for the downlink channel and slots for the uplink channel. Further, the TDD system is divided into a WB-TDD (Wide Band Time Division Duplexing) system and an NB-TDD (Narrow Band Time Division Duplexing) system. The WB-TDD system and the FDD system support a chip rate of 3.84 Mcps, while the NB-TDD system supports a chip rate of 1.28 Mcps.

Presently, the ongoing international standardization work on future mobile communication systems is separately carried out for an asynchronous system represented by a UMTS (Universal Mobile Telecommunication System) system and a synchronous system represented by a cdma-2000 system. The technologies for the WB-TDD system and the NB-TDD system of the asynchronous system are defined by the 3GPP ($3^{rd}$ Generation Partnership Project).

Meanwhile, in the CDMA mobile communication system, propagation delay occurs inevitably during data communication between a Node B and a UE (User Equipment) through a radio channel. In the WB-TDD and FDD CDMA mobile communication systems, the propagation delay is measured depending on the time when a random access channel (RACH) transmitted by the UE arrives at the Node B.

Figure 1:
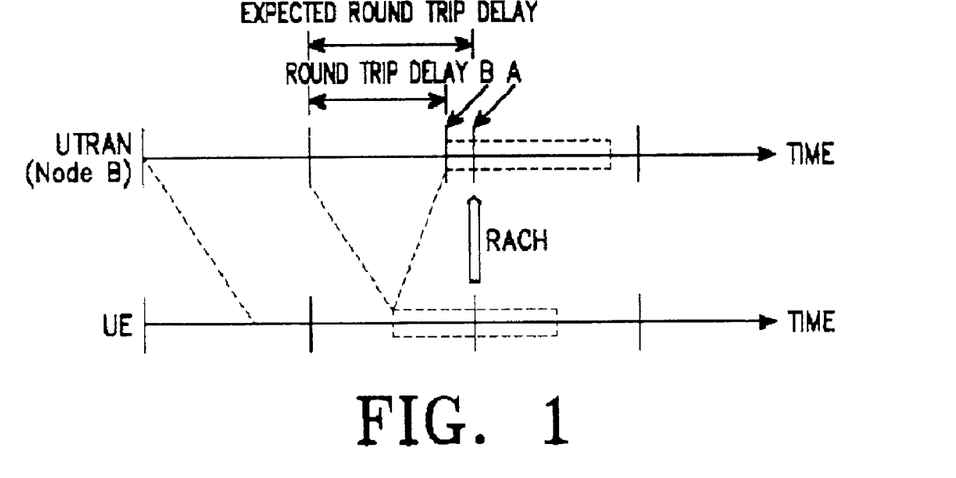
FIG. 1 illustrates round trip delay occurred in a WB-TDD CDMA mobile communication system.

FIG. 1 illustrates an example of round trip delay occurred in a WB-TDD CDMA mobile communication system. In FIG. 1, a UTRAN (UMTS Terrestrial Radio Access Network), a term used in the asynchronous CDMA mobile communication system, includes the Node B, a serving radio network controller (SRNC) for controlling a plurality of Node Bs, and a core network (CN).

A method for measuring a round trip delay value will be described with reference to FIG. 1. The Node B in the UTRAN can measure the round trip delay value by calculating a difference between a reference arrival time A of an RACH and an actual arrival time B of the RACH. The RACH is transmitted by the UE at a specified time. The reference arrival time A refers to an expected arrival time of the RACH determined by the Node B considering expected propagation delay, while the actual arrival time B refers to a time when the RACH is actually received at the Node B. Further, the round trip delay value refers to a time period between a time when the Node B transmitted data to the UE and a time when the Node B receives a response to the transmitted data from the UE. The Node B previously recognizes the reference arrival time A. Thus, once the actual arrival time B is measured, the Node B can calculate the round trip delay value. That is, the Node B can calculate a desired actual round trip delay value by applying an offset (or error) between the reference arrival time A and the actual arrival time B to an expected round trip delay value. In addition, it is possible to calculate an actual propagation delay value from the UE to the Node B by halving the calculated round trip delay value.

The propagation delay value measured by the Node B is transmitted to an SRNC servicing the UE, through a frame protocol message. The frame protocol message is a message exchanged between the Node B and the SRNC. The Node B transmits the measured propagation delay value to the SRNC by adding it to a header of the frame protocol message.

In the FDD CDM mobile communication system, the propagation delay value measured by the Node B and then transmitted to the SRNC is used when the SRNC sets transmission power required for data transmission through a forward access channel (FACH). In addition, the propagation delay value can also be used for a location service (LCS) for estimating a current location of the UE. That is, the SRNC determines a preferred transmission power level to be used when transmitting an FACH frame to the UE, by analyzing the propagation delay value received from the Node B, and transmits the determined power level to the Node B. The Node B then transmits the FACH to the UE using the preferred transmission power level transmitted from the SRNC. As the propagation delay value measured by the Node B is higher, the transmission power level at which the Node B transmits the FACH frame is also higher.

As stated above, the WB-TDD and FDD CDMA mobile communication systems use the RACH provided from the UE to the Node B in order to measure the propagation delay. The UE transmits the RACH at a time slot of the Node B or a start point of the frame. To this end, the UE should be synchronized with the Node B. The UE is synchronized with the Node B using a primary common control physical channel (P-CCPCH) from the Node B.

However, in the NB-TDD CDMA mobile communication system, since the UE transmits the RACH by expecting a transmission point of an uplink time slot, it is not possible to measure the propagation delay value with the above-stated propagation delay measurement method.

The reason why the NB-TDD CDMA mobile communication system cannot measure the propagation delay time will be described below in detail. In the NB-TDD CDMA mobile communication system, one frame is referred to as a "radio frame" and the radio frame has a length of 10 ms. The radio frame is divided into two sub-frames each having a length of 5 ms, and each of the sub-frames is comprised of 7 time slots.

Figure 2:
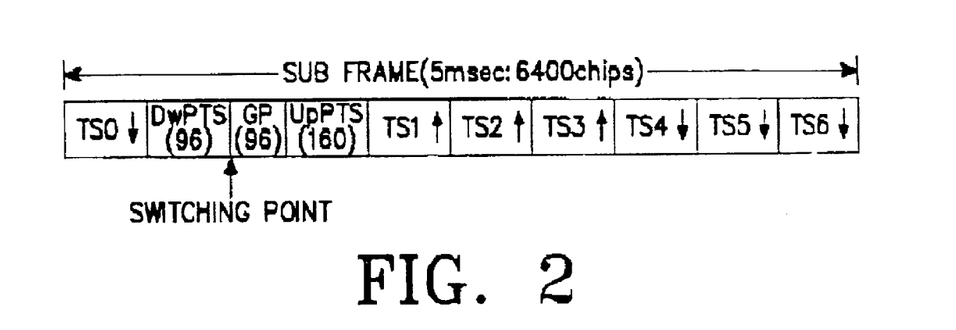
FIG. 2 illustrates a structure of a sub-frame used in an NB-TDD CDMA mobile communication system.

FIG. 2 illustrates a structure of a sub-frame typically used in the NB-TDD CDMA mobile communication system. Referring to FIG. 2, the sub-frame is comprised of 7 normal time slots TS0–TS6, a downlink pilot time slot (DwPTS), and an uplink pilot time slot (UpPTS). In FIG. 2, the time slots represented by downward arrows are downlink time slots transmitted from the Node B to the UE, while the time slots represented by upward arrows are uplink time slots transmitted from the UE to the Node B. The DwPTS is a time period where the Node B transmits a predetermined code sequence through a downlink pilot channel signal so that the UE may be synchronized with the Node B. The UpPTS is a time period where the UE transmits a specific code sequence to the Node B for, e.g., power control through an uplink pilot channel signal. In FIG. 2, a boundary between the downlink time slot and the uplink time slot is called a "switching point". Among the time slots, a first time slot TS0 is fixedly used as the downlink time slot, and the first time slot TS0 is used to transmit a P-CCPCH signal.

A reason why the NB-TDD CDMA mobile communication system supporting the radio frame structure shown in FIG. 2 cannot exactly measure the propagation delay will be described below.

The NB-TDD CDMA mobile communication system, as stated above, separates the downlink and the uplink in a time slot unit. Therefore, the UE should transmit an uplink signal such that the uplink signal does not interfere with a downlink signal in the Node B. That is, the UE transmits the uplink signal such that the Node B can receive the uplink signal in the uplink time slot period shown in FIG. 2. Therefore, the NB-TDD CDMA mobile communication system indispensably requires an operation of synchronizing the UE with the Node B. The UE is synchronized with the Node B using a downlink pilot time slot (DwPTS) received from the Node B.

After being synchronized with the Node B, the UE receives a primary common control physical channel (P-CCPCH) transmitted from the Node B, and estimates an approximate distance from the Node B by measuring a path loss of the P-CCPCH depending on its attenuation. After estimating the distance from the Node B, the UE shifts a transmission point of an UpPTS signal such that the Node B can receive the UpPTS signal at a start boundary point of the UpPTS.

The reason why the Node B should receive the UpPTS signal from the UE at the start boundary point of the UpPTS is to prevent interference due to overlapping of a downlink signal and an uplink signal in the NB-TDD system, which separates the downlink signal and the uplink signal on a time division basis.

The Node B receives the UpPTS signal and determines whether the UpPTS signal has been received exactly at its UpPTS period. If there exists a time difference, the Node B transmits a transmission point correcting value to the UE through a forward physical access channel (FPACH). Upon receiving the transmission point correcting value through the FPACH, the UE transmits an RACH message at a transmission point corrected based on the received transmission point correcting value. That is, the UE determines a transmission point of the RACH message using the transmission point correcting value received through the FPACH. Therefore, the RACH message can arrive at the Node B at a preferred time.

However, the Node B cannot recognize how much the UE has shifted the transmission point of the UpPTS signal in order that the Node B can receive the UpPTS signal at the UpPTS start boundary point. Therefore, the Node B cannot measure propagation delay of the UpPTS signal from the UE, and thus cannot properly control transmission power according to the propagation delay.

SUMMARY OF THE INVENTION

It is, therefore, an object of the present invention to provide an apparatus and method for measuring propagation delay between a Node B and a UE in an NB-TDD CDMA mobile communication system.

It is another object of the present invention to provide an apparatus and method for measuring a propagation delay value by a Node B and transmitting the measured propagation delay value to an SRNC in an NB-TDD CDMA mobile communication system.

It is further another object of the present invention to provide an apparatus and method for measuring a propagation delay value by a UE and transmitting the measured propagation delay value to an SRNC in an NB-TDD CDMA mobile communication system.

It is yet another object of the present invention to provide an apparatus and method for measuring a propagation delay value using an RACH in an NB-TDD CDMA mobile communication system.

It is still another object of the present invention to provide an apparatus and method for measuring a propagation delay value using a dedicated channel in an NB-TDD CDMA mobile communication system.

According to a first aspect of the present invention, there is provided a method for measuring a propagation delay value of a frame transmitted by a UE to a Node B in a TDD mobile communication system including a frame divided into two sub-frames, each of the sub-frames having a plurality of time slots and also having a downlink pilot time slot and an uplink pilot time slot, both intervening between a first time slot and a second time slot of the plurality of time slots, the system also including the Node B for transmitting the frame fixed to a time axis, and the UE for transmitting a propagation-delayed frame in response to the frame received from the Node B. The method comprises acquiring synchronization with the Node B based on a downlink pilot channel signal transmitted in a period of the downlink pilot time slot, and determining an estimated round trip delay value T1 by comparing transmission power of a physical common channel signal in the first time slot with reception power of the physical common channel signal; transmitting an uplink pilot channel signal by applying the estimated round trip delay value T1 to a desired transmission point of the uplink pilot channel signal; receiving a transmission point correcting value T2 through a forward physical access channel (FPACH) signal transmitted from the Node B in a period of one downlink time slot among the time slots; and transmitting a physical random access channel (PRACH) message with the estimated round trip delay value T1 at a transmission point determined based on the transmission point correcting value T2 and the estimated round trip delay value T1, so that the PRACH message is received at the Node B at a start point of a period of one uplink time slot among the time slots.

According to a second aspect of the present invention, there is provided a method for measuring a propagation delay value of a frame transmitted by a Node B to a UE in a TDD mobile communication system including a frame divided into two sub-frames, each of the sub-frames having a plurality of downlink time slots, a plurality of uplink time slots, a downlink pilot time slot and an uplink pilot time slot, and further including the Node B for transmitting a physical common channel signal in a period of a first time slot of the sub-frame, and the UE for calculating an estimated round trip delay value T1 based on a path loss of the physical common channel signal and transmitting the uplink pilot time slot by applying the calculated round trip delay value T1. The method comprises determining a transmission point correcting value T2 based on an offset between an arrival point of an uplink pilot channel signal and a desired arrival point of the uplink pilot channel signal in the uplink pilot time slot period; including the transmission point correcting value T2 in a forward physical access channel (FPACH) signal, and transmitting the PFACH signal to the UE in a period of one downlink time slot among the downlink time slots; receiving a physical random access channel (PRACH) message with the estimated round trip delay value T1, transmitted from the UE at a transmission point determined based on the transmission point correcting value T2 and the estimated round trip delay value T1, in a period of one uplink time slot among the uplink time slots; and transmitting the estimated round trip delay value T1 and the transmission point correcting value T2 included in the PRACH message to a radio network controller (RNC) to which the UE belongs, along with an RACH signaling message, so that the RNC determines a round trip delay between the Node B and the UE.

According to a third aspect of the present invention, there is provided an apparatus for measuring a propagation delay value of a frame exchanged between a UE and a Node B in a TDD mobile communication system including a frame divided into two sub-frames, each of the sub-frames having a plurality of downlink time slots, a plurality of uplink time slots, a downlink pilot time slot and an uplink pilot time slot, and further including the Node B for transmitting a physical common channel signal in a period of a first time slot of the sub-frame, and the UE for calculating an estimated round trip delay value T1 based on a path loss of the physical common channel signal and transmitting the uplink pilot time slot by applying the calculated round trip delay value T1. The UE transmits an uplink pilot channel signal at a transmission point determined by applying the estimated round trip delay value T1 to a desired transmission point of the uplink pilot channel signal, and transmits a physical random access channel (PRACH) message with the estimated round trip value T1 at a transmission point determined based on the transmission point correcting value T2 and the estimated round trip delay value T1 received through a forward physical access channel (FPACH) signal. The Node B determines the transmission point correcting value T2 based on an offset between an arrival point of the uplink pilot channel signal and a desired arrival point of the uplink pilot channel signal, transmits the determined transmission point correcting value T2 along with the FPACH signal in a given downlink time slot period, and transmits the estimated round trip delay value T1 and the transmission point correcting value T2 included in the PRACH message received at a start point of a given uplink time slot period to a radio network controller (RNC) along with an RACH signaling frame. The RNC receives the RACH signaling frame and determines a round trip delay between the UE and the Node B based on the estimated round trip delay value T1 and the transmission point correcting value T2 included in the received RACH signaling frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Although a description of the contents not directly related to the present invention has not been provided, reference can be made to the contents adopted by or submitted to the 3GPP for better understanding of the invention. In addition, although the present invention will be described with reference to the NB-TDD system, it is also possible to apply the present invention to any system which cannot measure a round trip delay, like the existing NB-TDD system.

First, a principle and operation of the present invention will be described below. In the NB-TDD CDMA mobile communication system, the UE receives a DwPTS from the Node B, and then performs synchronization with the Node B depending on a code sequence in the received DwPTS. After the synchronization, the UE detects Node B system information from broadcast channel (BCH) information of the P-CCPCH transmitted in a period of the first time slot TS0 received from the Node B. The Node B system information includes transmission power information of the P-CCPCH. When there is data to transmit, the UE measures reception power of the P-CCPCH signal, and detects a signal attenuation by comparing the measured reception power with the transmission power information of the P-CCPCH. In general, the signal attenuation caused by a path loss depends upon the distance from the Node B. Thus, the UE can estimate the distance from the Node B by measuring the signal attenuation, and can also estimate a round trip delay value T1 depending on the estimated distance. Therefore, the UE calculates a transmission point of the UpPTS signal or a certain reference time point considering the estimated round trip delay value T1. The UE transmits the UpPTS signal to the Node B at a transmission point determined by reflecting the estimated round trip delay value T1. At this moment, the Node B determines whether the UpPTS signal arrives in the UpPTS period, and calculates transmission point correcting information T2 based on a difference (offset) between a start point of the UpPTS period and an arrival point of the received UpPTS signal. That is, the transmission point correcting information T2 is an offset between the expected (or desired) arrival point of the UpPTS signal and the actual arrival point of the UpPTS signal. The Node B transmits the transmission point correcting information T2 to the UE through the FPACH. When constructing the RACH message, the UE includes the estimated round trip delay value T1 in the RACH message. Upon receiving the transmission point correcting information T2, the UE determines a transmission point of the RACH message by adding the received transmission point correcting information T2 to the estimated round trip delay value T1. The UE transmits the RACH message including the estimated round trip delay value T1 to the Node B at the determined transmission point. The Node B transmits the RACH message to the SRNC along with the transmission point correcting information T2. The SRNC calculates a round trip delay value τ using the transmission point correcting information T2 and the estimated round trip delay value T1 included in the RACH message. When transmitting an FACH signal to the UE, the SRNC determines transmission power of the FACH signal using the round trip delay value τ, and then informs the Node B of the determined transmission power. The Node B can transmit the FACH signal to the UE at the determined transmission power.

Alternatively, the UE can also calculate the round trip delay value τ using a round trip delay value T1 estimated by the UE itself and the transmission point correcting information T2 received from the Node B. The round trip delay value τ is the sum of the estimated round trip delay value T1 and the transmission point correcting information T2. That is, the UE can calculate a relatively correct round trip delay value based on the transmission point correcting information T2 transmitted by the Node B with respect to the round trip delay value T1 estimated by the UE using the P-CCPCH signal.

Figure 3:
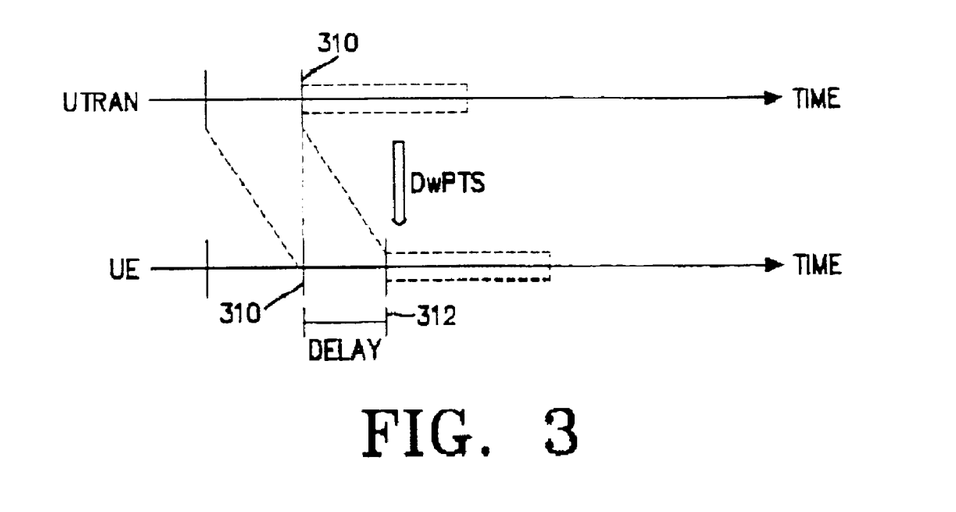
FIG. 3 illustrates propagation delay of a downlink time slot in the NB-TDD CDMA mobile communication system.

FIG. 3 illustrates exchange of a DwPTS signal between a UE and a Node B in an NB-TDD CDMA mobile communication system. As illustrated in FIG. 3, a DwPTS signal received at the UE has a time delay from a transmission point 310 of the DwPTS till an arrival point 312 of the DwPTS according to the distance between the Node B and the UE. In order to resolve the time delay problem, the UE transmits an UpPTS signal to the Node B by shifting the transmission point determined by performing synchronization with the Node B.

Figure 4:
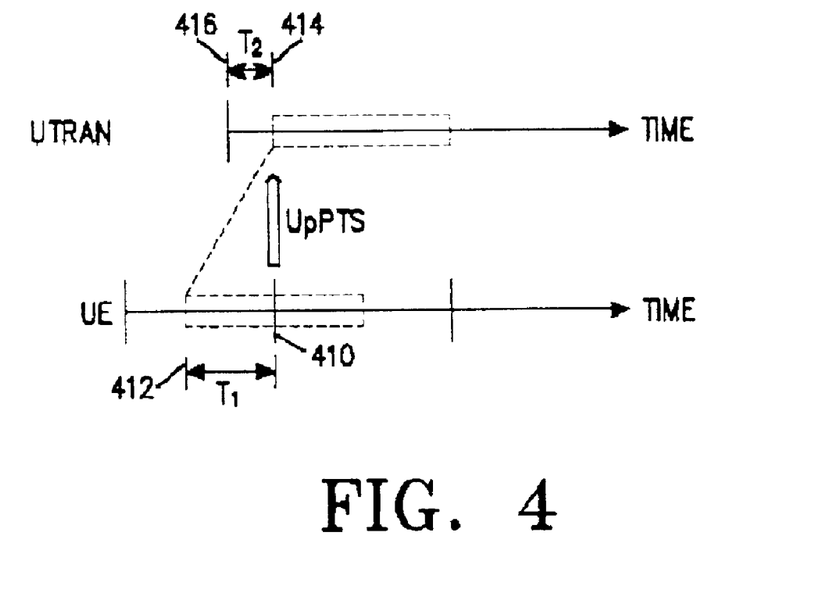
FIG. 4 illustrates propagation delay of an uplink time slot in the NB-TDD CDMA mobile communication system.

A method for transmitting the UpPTS signal by shifting the transmission point is illustrated in FIG. 4. It can be understood from FIG. 4 that the UE shifts a transmission point 412 of the UpPTS signal, T1 ahead of a transmission point 410 determined by performing synchronization with the Node B. The estimated round trip delay value T1 can be estimated based on a value determined by measuring an attenuation of the P-CCPCH signal from the Node B. In FIG. 4, T1 represents a forward shift.

In FIG. 4, the Node B receives the UpPTS transmitted from the UE at a given arrival point 414. Upon failure to receive the UpPTS at a reference point 416 where it should be received, the Node B measures an arrival offset (error) T2, the transmission point correcting information. The arrival offset T2 is measured based on a difference between the reference point 416 where the UpPTS should arrive and an actual arrival point 414 where the UpPTS actually arrives.

Figure 5:
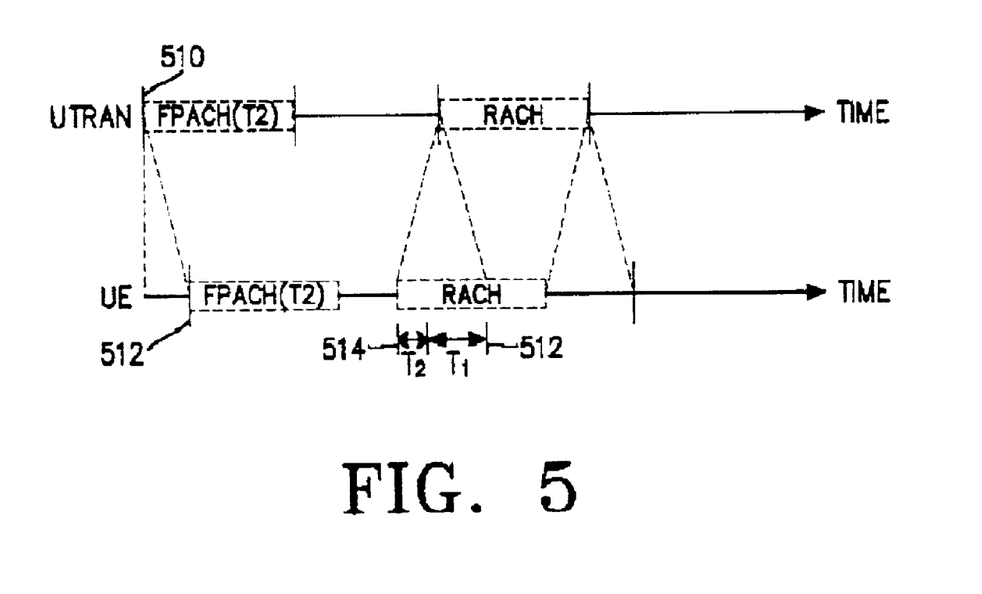
FIG. 5 illustrates a method for transmitting a forward physical access channel (FPACH) to compensate for propagation delay of the uplink time slot in the NB-TDD CDMA mobile communication system.

In FIG. 5, the Node B transmits information on the T2 through an FPACH, and upon receiving the T2 information, the UE transmits an RACH message at a time point calculated by adding the T2 to the T1. Meanwhile, the UE transmits an RACH message at a transmission point 514 determined by adding the T1 previously known by the UE itself to the T2 provided through the FPACH. The RACH message includes the T1. The Node B receives the RACH message transmitted from the UE in an uplink time slot period.

Figure 6:
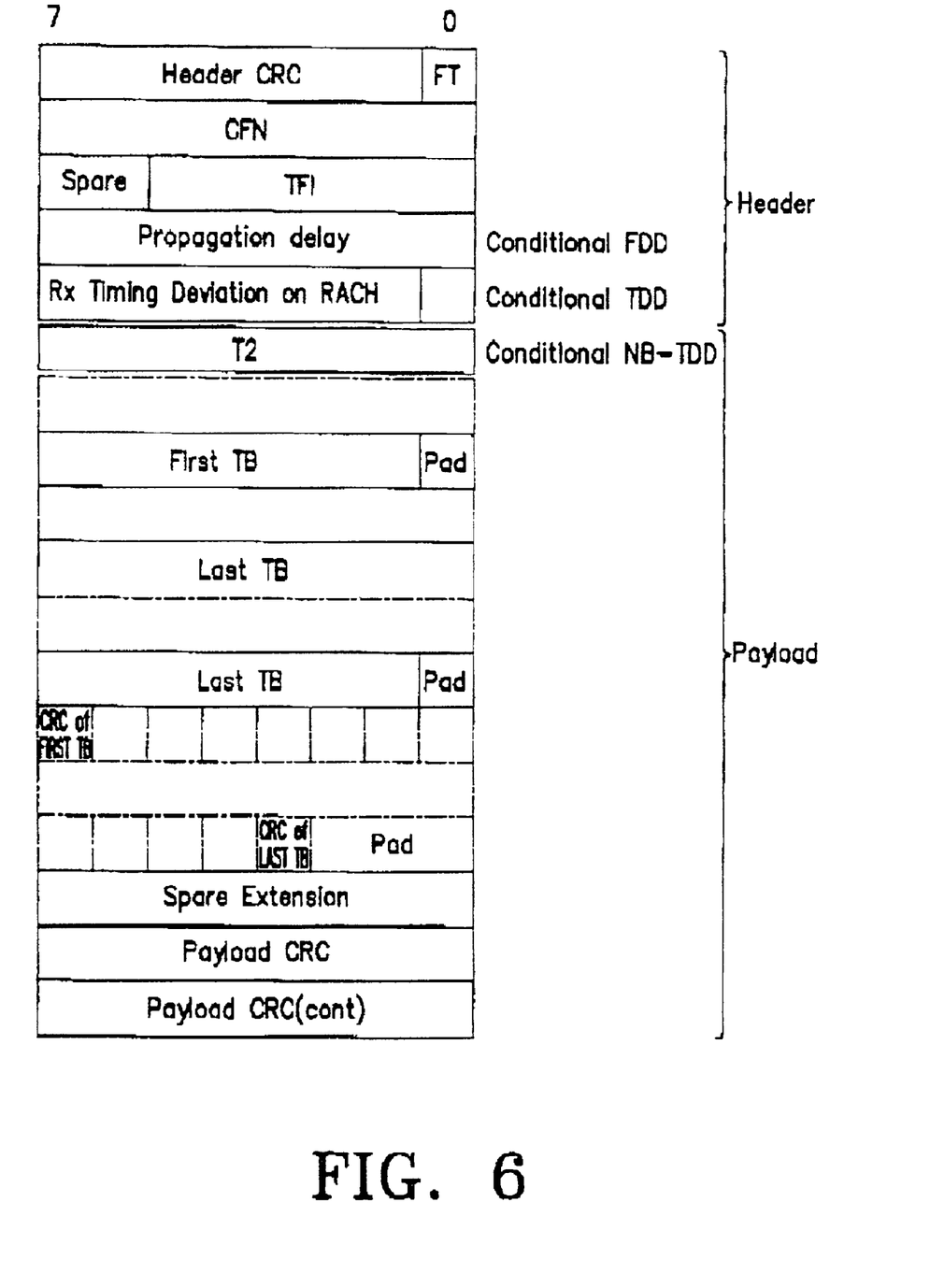
FIG. 6 illustrates a frame format of a random access channel (RACH) transmitted from a Node B to a serving radio network controller (SRNC) in the NB-TDD CDMA mobile communication system.

FIG. 6 illustrates a message format used when the Node B transmits the arrival offset T2 measured in the above process to the SRNC. In the message format shown in FIG. 6, a payload includes the T1 and a header includes the T2 in the NB-TDD system.

Shown in Table 1 is a format of the RACH message transmitted from the UE to the Node B.

TABLE 1

| Information Element/group name | Need | Multi | Type and reference | Semantics description |
|---|---|---|---|---|
| Measurement result current cell | | | | |
| CHOICE mode | MP | | | |
| >FDD | | | | |
| >>CHOICE measurement quantity | MP | | | |
| >>>CPICH $E_C/N_O$ | | | Integer (−20 . . . 0) | In dB |
| >>>CPICH RSCP | | | Integer (−115 . . . −40) | In dBm |
| >>>Pathloss | | | Integer (−46 . . . 158) | In dB |
| >TDD | | | | |
| >>Timeslot List | OP | 1 to 4 | | |
| >>>Timeslot ISCP | MP | | Timeslot ISCP info 10.3.7.90 | The UE shall report the Timeslot ISCP in the same order as indicated in the cell info |
| >>Primary CCPCH RSCP | OP | | Primary CCPCH RSCP info 10.3.7.79 | |
| >>T1 | OP | | Integer (−96 . . . 0) | In Chip |
| The Rest Omitted | | | | |

It is noted from Table 1 that T1 information is included in an RACH signaling message or a radio resource control (RRC) message in the NB-TDD system. The UE can transmit not only the T1 information but also the T2 information to the Node B, using the RACH signaling message. This is because the UE, as stated above, can recognize the point T2 through the FPACH transmitted by the Node B. A method for transmitting the T1 information and the T2 information using the RACH signaling message is illustrated FIGS. 11B and 11C.

Figure 11A:
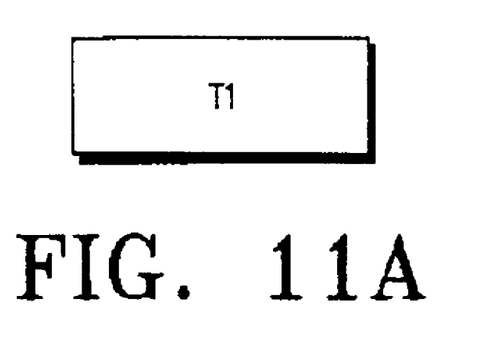
FIGS. 11A to 11C illustrate various methods of transmitting an RACH signaling message according to an embodiment of the present invention.

FIG. 11A illustrates a method for transmitting only T1 through the RACH signaling message. In this case, upon receiving an RACH signaling message including the T1 from a UE, a Node B adds T2 of the UE to the received RACH signaling message, and then transmits the T2-added RACH signaling message to an SRNC managing the UE, thus allowing the SRNC to calculate a propagation delay value between the Node B and the UE.

Figure 11B:
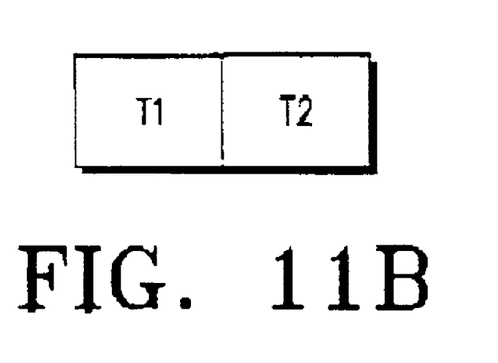

FIG. 11B illustrates a method for transmitting T1 and T2 through the RACH signaling message. In this case, upon receiving an RACH signaling message including the T1 and the T2 from a UE, a Node B transmits the received RACH signaling message to an SRNC without a separate operation, thus allowing the SRNC to recognize a propagation delay value between the UE and the Node B.

More specifically, the UE stores T1 (to be used at a transmission point of the UpPTS before generation of an RACH signaling message) in the RACH signaling message, receives an FPACH, and then reports T2 included in the received FPACH to a radio resource controller (RRC). The term "RRC" used in the future mobile communication system refers to a part managing radio resources. The RRC adds the T2 received through the FPACH to the RACH signaling message, and then transmits the T2-added RACH signaling message to the SRNC through the Node B.

Figure 11C:
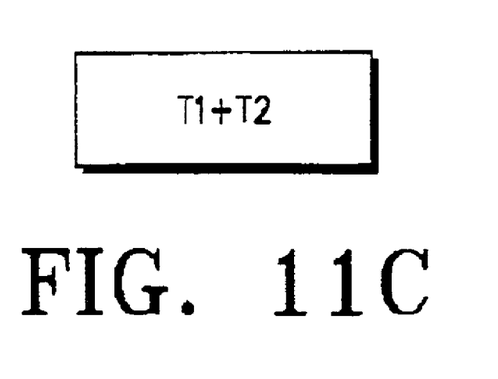

FIG. 11C illustrates a method for calculating T1 and T2 by the UE and then transmitting the calculated values through an RACH signaling message. This method is identical in principle to the method of FIG. 11B except for the transmission format. Since the UE recognizes the T1 and T2 values, the UE can personally calculate the propagation delay value while transmitting the T1 and the T2. For example, the UE can calculate the propagation delay value by adding the T2 to the T1 and then dividing the added value by 2. As another example, the UE transmits an UpPTS at a given time point after reception of a DwPTS, and upon receipt of the UpPTS, the Node B calculates a difference between a predetermined (or desired) time point for a specific Node B and an arrival point of the UpPTS, and reports the calculated difference to the UE through the FPACH, thus allowing the UE to calculate the propagation delay value.

Figure 7:
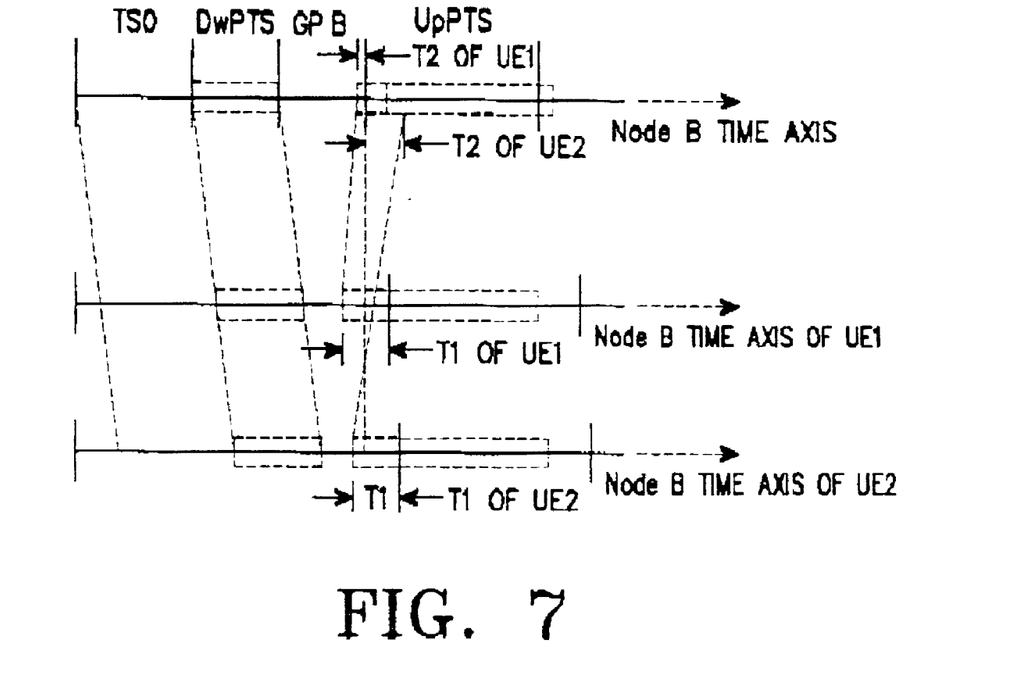
FIG. 7 illustrates propagation delay of uplink pilot time slots (UpPTSs) transmitted from two UEs in the NB-TDD CDMA mobile communication system.

FIG. 7 illustrates propagation delay occurring when a UE1 and a UE2 transmit UpPTS signals, according to an embodiment of the present invention. As illustrated in FIG. 7, if the UE1 and the UE2 transmitted UpPTS signals to a Node B at their transmission points both shifted by T1, then the UpPTS signals undergo different propagation delays. As a result, the UpPTS signal transmitted by the UE1 and the UpPTS signal transmitted by the UE2 will arrive at the Node B at different arrival points. Occurrence of the different propagation delays is caused because a distance between the UE1 and the Node B is different from a distance between the UE2 and the Node B. Therefore, T2 for the UE1 and T2 for the UE2 are set to difference values.

Meanwhile, if it is assumed in FIG. 7 that the UpPTS signal is to arrive at the Node B at a desired arrival point B, then the UE1 should transmit the UpPTS signal by reducing a shift in the transmission point by the determined T2 of the UE1 than when first transmitting the UpPTS signal by shifting the transmission point of the T1. Therefore, the Node B should report the determined T2 of the UE1 to the UE1 through the FPACH. The UE2 should transmit the UpPTS signal by shifting the transmission point by the determined T2 of the UE2 than when first transmitting the UpPTS signal by shifting the transmission point of the T1. Therefore, the Node B should report the determined T2 of the UE2 to the UE2 through the FPACH. Then, the UE1 and the UE2 transmit the RACH messages by applying their T2 values, and the Node B can correctly receive the RACH messages transmitted from the UE1 and UE2 in the uplink time slot period.

Figure 8:
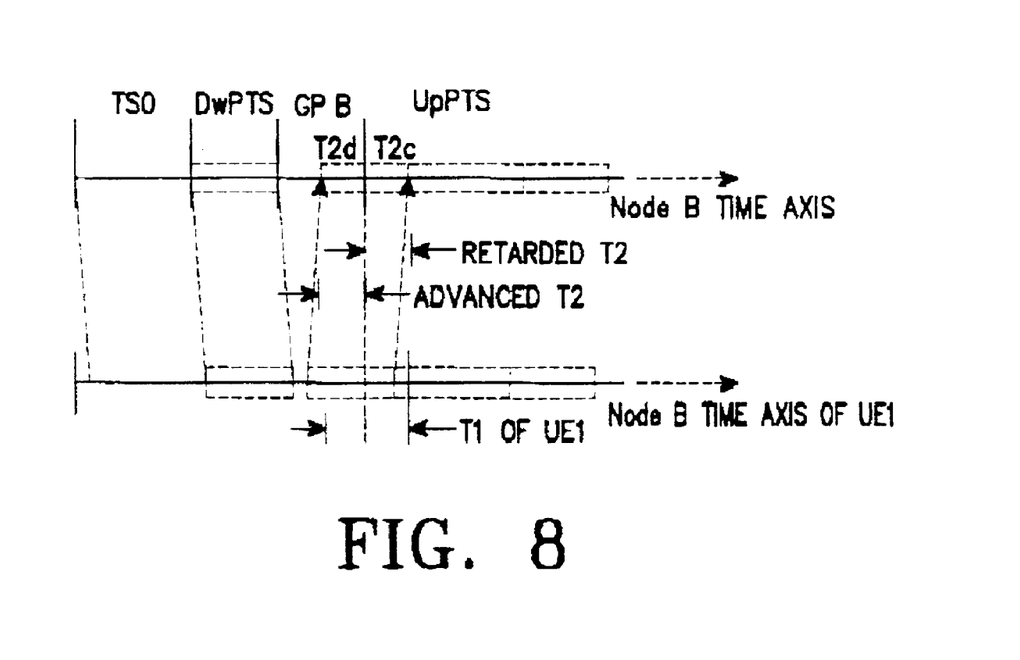
FIG. 8 illustrates a method for measuring an arrival time offset at the Node B in the NB-TDD CDMA mobile communication system.

FIG. 8 illustrates a method for measuring T2 of FIG. 7. Referring to FIG. 8, if the UE1 transmits an UpPTS by shifting the transmission point by T1, the UpPTS may arrive at the Node B ahead of or behind a reference point (or desired arrival point) B. If the UpPTS arrives at the Node B ahead of the reference point B, the Node B will request the UE1 to transmit the UpPTS at a time T2d behind T1. Otherwise, if the UpPTS arrives at the Node B behind the reference point B, the Node B will request the UE1 to transmit the UpPTS at a time T2c ahead of the T1. Therefore, the UpPTS arrived at the Node B can be time-aligned. The T2 can be determined by $$B - T2c = T_2 > 0$$
$$B - T2d = T_2 > 0 \quad \text{Equation (1)}$$

In FIG. 8, a difference value between the expected (or desired) arrival point B and the actual arrival point of the UpPTS can be defined as the advanced T2d and the retarded T2c. The T2d and the T2c can have a value of −96 chips ≦T2≦32 chips. The advanced "−96 chips" in the whole range is determined considering a guard period (GP) of FIG. 2.

The T1 measured by the UE and the T2 measured by the Node B can be used in measuring a propagation delay value between the UE and the Node B. The propagation delay between the UE and the Node B can be represented by $$T_{tot} = T1 + T2 \quad \text{Equation (2)}$$

As shown in Equation (2), the T1 is defined as a value representing how many chips ahead of a reference (or desired) transmission point the UE has transmitted the UpPTS signal on a Node B's time axis. Further, the T2 is defined as a difference between a reference (or desired) arrival point and an actual arrival point of the UpPTS on the Node B's time axis.

Therefore, it is possible to measure a propagation delay value between the UE and the Node B by using the T1 measurable by the UE and the T2 measurable by the Node B.

The T2 measured by the Node B is transmitted to the UE using an FPACH message. Upon receiving the T2 from the Node B, the UE transmits an RACH message to the Node B by shifting the transmission point of the RACH message by the T2, so that the Node B can receive the RACH message which is expected to undergo propagation delay.

A shift in the transmission point shown in FIG. 4 will be represented by the following formula. For example, it will be considered that T2 is expressed with 8 bits. Then, a value that can be expressed with 8 bits is $2^8 = 256$, and if a resolution is ½, the expressed value is represented by $$0 \leq N \leq 255 \quad \text{Equation (3)}$$

It will be assumed herein that a range where it is possible to shift the transmission point determined based on the T2 measured by the Node B is −96 chips ≦T2≦32 chips.

Since the value is expressed with 8 bits, the range can be re-written as follows.

$$-192 \leq Y \leq 64 \qquad \text{Equation (4)}$$

$$T2 = Y \times \frac{1}{2}$$

$$N = Y + 192$$

From Equation (4), a range of the T2 is represented by $$\frac{N}{2} - 96 \leq T2 \leq \frac{(N+1)}{2} - 96.$$

That is, if T2 has a value between −96 and $$\frac{1}{2} - 96,$$

N is set to '0', and the value '0' is transmitted using 8 bits. Upon receiving the value '0', the UE can recognize that the T2 has a value between −96 and $$\frac{1}{2} - 96.$$

To transmit RACH message, the UE first transmits the UpPTS signal. That is, when an upper layer creates the UpPTS signal and transmits an RACH message request to a physical layer, the physical layer of the UE transmits the UpPTS signal. When the UpPTS signal is transmitted in this manner, it can be assumed that the RACH message has been previously created. However, since the UE receives the T2 after transmitting the UpPTS signal, the UE cannot add the T1 and the T2 to the RACH message. Therefore, it is not possible to transmit the propagation delay value measured using the T1 and the T2, through the RACH message. However, the T1 is a value that can be determined by the UE before transmitting the UpPTS signal. Therefore, the T1 can be added to the RACH.

The present invention provides a method for transmitting T1 measurable by the UE and T2 measurable by the Node B to the SRNC. The T1 measurable by the UE, as stated above, can be added to the RACH message. That is, the UE calculates the T1 by measuring an attenuation caused by a path loss of a signal transmitted over the P-CCPCH before constructing the RACH message, and then adds the calculated T1 to the RACH message as shown in Table 1. The T1 can be added to signaling data of the RACH message. It is noted from Table 1 that an information element "measured results on RACH" is included in several messages such as a cell update message. The messages are transmitted from the UE to the Node B through the RACH, and the messages include the T1 information. The Node B transmits the RACH message to the SRNC along with the T2 information.

As another method, the UE can also transmit the RACH message along with both the T1 information and the T2 information. That is, the UE calculates the T1 by measuring an attenuation of a signal transmitted over the P-CCPCH before constructing the RACH message, and then transmits the UpPTS signal by shifting the transmission point by the T1. The Node B then calculates the T2 by receiving the UpPTS signal, and informs the UE of the calculated T2 using an FPACH message. Upon receiving the T2, the UE creates an RACH message including the T1 and the T2, and transmits the created RACH message to the Node B. The Node B transmits the RACH message with the T1 and the T2 to the SRNC. Thus, the SRNC can recognize the round trip delay value.

Figure 9:
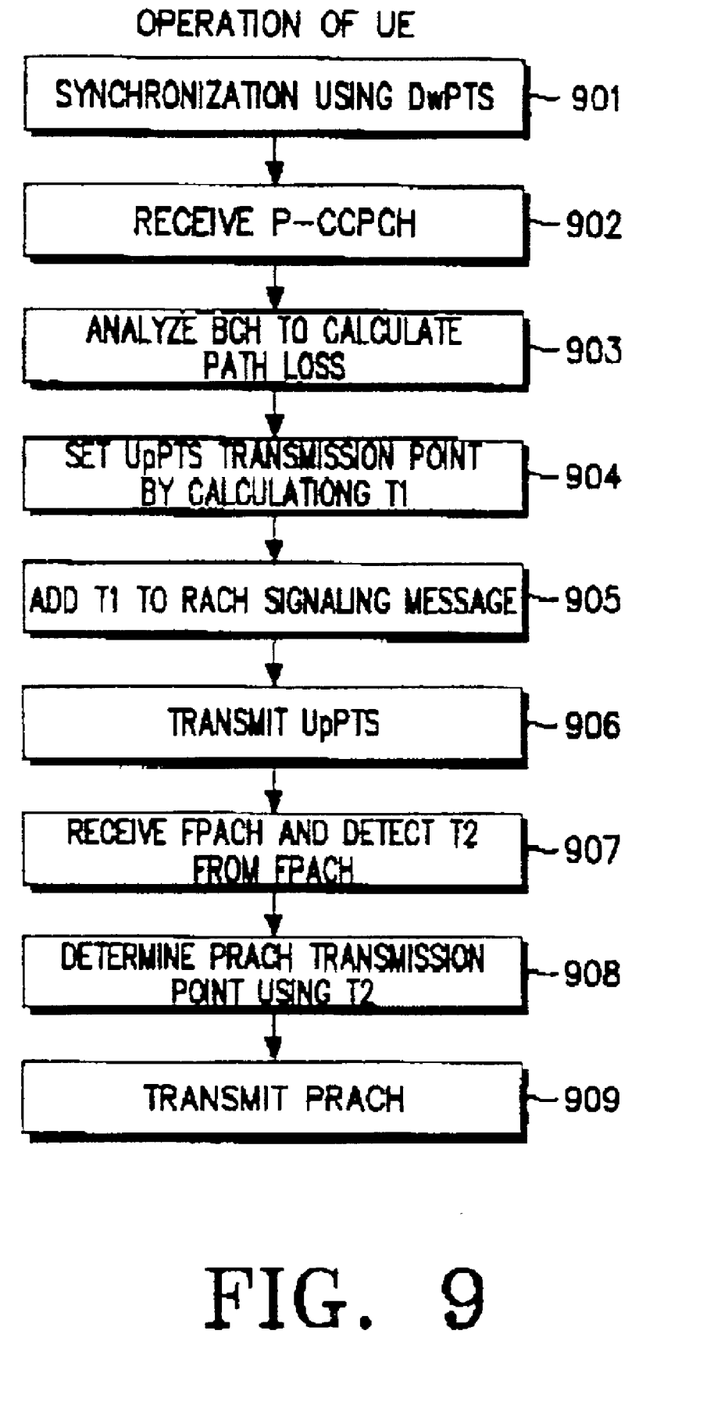
FIG. 9 illustrates an operation of the UE for measuring a propagation delay value in the NB-TDD CDMA mobile communication system according to an embodiment of the present invention.

FIG. 9 illustrates an operation of the UE for measuring a propagation delay value according to an embodiment of the present invention. It is assumed in FIG. 9 that the UE transmits the UpPTS signal by shifting the transmission point by T1 using the method shown in FIG. 11A.

Referring to FIG. 9, in step 901, the UE is synchronized with the Node B using a DwPTS signal. In this process, the UE is time-aligned with the Node B. After being synchronized with the Node B in the step 901, the UE receives P-CCPCH transmitted by the Node B in step 902, and then analyzes BCH included in the received P-CCPCH in step 903. The BCH is a channel for transmitting system information from the Node B to the UE. The system information includes information on transmission power of the P-CCPCH transmitted from the Node B. The UE can calculate a path loss between the Node B to the UE by comparing the transmission power information of the P-CCPCH with reception power of the P-CCPCH. After calculating the path loss between the Node B and the UE, the UE calculates an estimated round trip delay value T1 using the path loss and determines a transmission point of an UpPTS signal using the calculated T1, in step 904. The UE adds the calculated T1 to an RACH signaling message in step 905. The RACH signaling message may include Uplink Direct Transfer, Cell Update, Initial Direct Transfer, RRC Connection Re-establishment Request, and RRC Connection Request messages, and the T1 is added to the RACH message. The RACH signaling message filled with the T1 is shown Table 1, by way of example. The UE transmits the UpPTS signal at the determined transmission point in step 906. After transmitting the UpPTS signal, the UE receives an FPACH signal transmitted from the Node B in response to the UpPTS signal, in step 907. The FPACH signal includes the T2 calculated by the Node B in the step 906 by receiving the UpPTS signal transmitted from the UE. Upon receiving the FPACH signal, the UE determines a transmission point of a physical random access channel (PRACH) using the T2 analyzed from the FPACH signal, in step 908. The term "PRACH" used in the future mobile communication system is a physical channel for transmitting the RACH. In step 909, the UE transmits the RACH signaling message with the T1 through the PRACH at the transmission point determined based on the T2.

Figure 10:
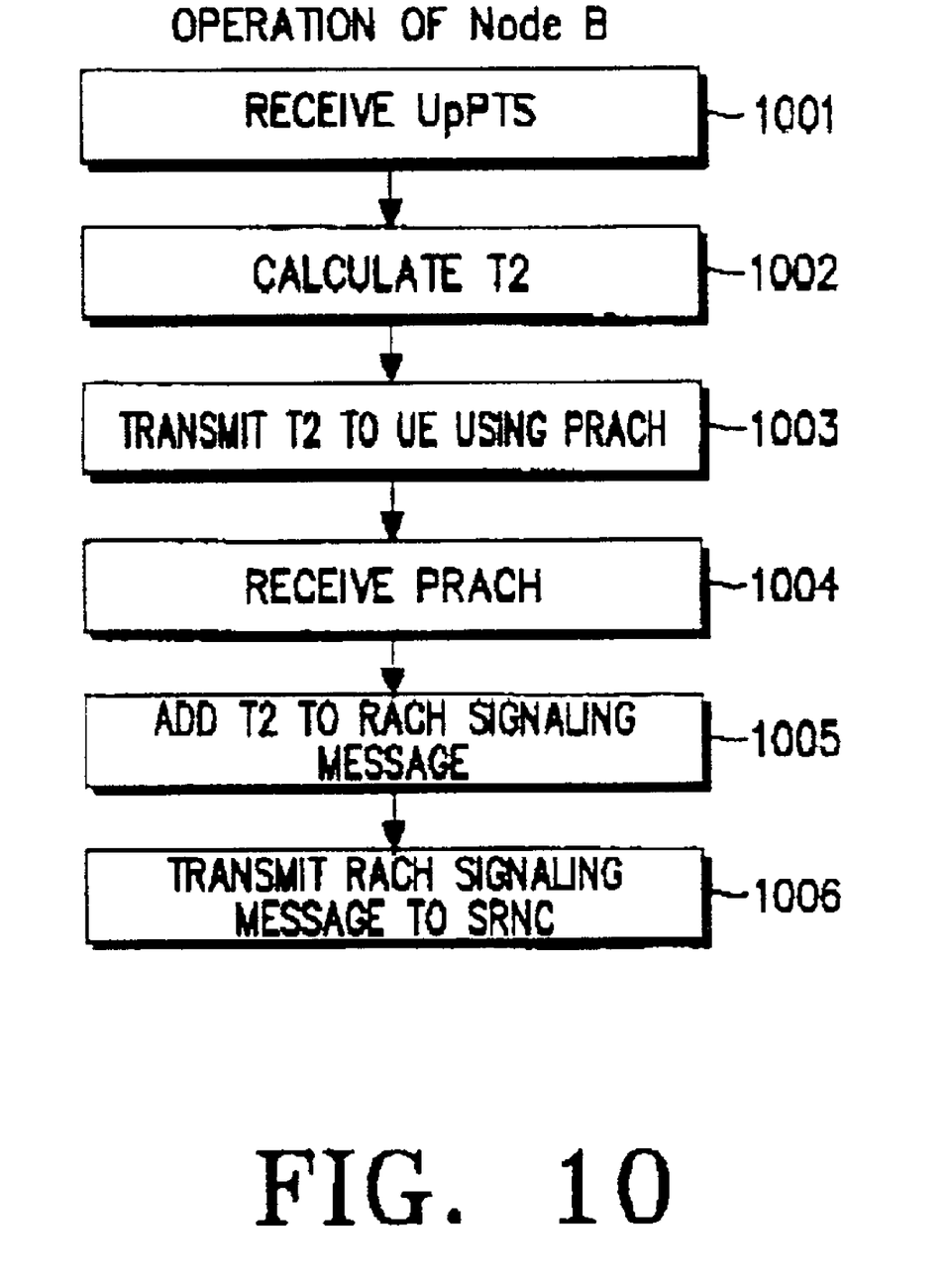
FIG. 10 illustrates an operation of the Node B for measuring a propagation delay value in the NB-TDD CDMA mobile communication system according to an embodiment of the present invention.

FIG. 10 illustrates an operation of the Node B for measuring a propagation delay value in an NIB-TDD CDMA mobile communication system according to an embodiment of the present invention.

Referring to FIG. 10, the Node B receives the UpPTS signal transmitted from the UE in step 1001, and then calculates T2 based on a difference between a reference (or desired) arrival point and an actual arrival point of the UpPTS signal in step 1002. Thereafter, in step 1003, the Node B transmits the FPACH signal in a given downlink time slot period. The FPACH signal includes the T2. In step 1004, the Node B receives the RACH message that the UE has transmitted at the transmission point controlled based on the T2 transmitted through the FPACH signal. The received RACH message includes an RACH signaling message. In step 1005, the Node B includes information on the T2 in a payload of the RACH signaling message and adds a header thereto, thus constructing an RACH signaling frame. In step 1006, the Node B transmits the RACH signaling frame with the T2 information to the SRNC. A format of the RACH signaling frame with the T2 is illustrated in FIG. 6, by way of example. Upon receiving the RACH signaling frame transmitted in the step 1006, the SRNC calculates a propagation delay value between the Node B having transmitted the RACH signaling frame and the UE having transmitted the RACH signaling message, using the T1 and the T2 included in the received RACH signaling frame. The SRNC calculates a round trip delay value based on the calculated propagation delay value.

The present invention has provided the method for measuring the round trip delay value or the propagation delay value, using a process for transmitting the RACH message. However, in an alternative embodiment, it is also possible to calculate a relatively exact round trip delay value or propagation delay value, even when communication between the UE and the Node B is performed through a dedicated channel (DCH). In this case, the measured round trip delay value or propagation delay value can be used for a location service of the UE. The "DCH" is a channel for transmitting user information or control information from the upper layer. When the NB-TDD CDMA mobile communication system performs communication using the DCH, the UE continuously controls a transmission point of an uplink DCH by synchronization shifting (SS). The SS technique controls the transmission point of the uplink DCH from the UE, so that the uplink DCH should be received at the Node B exactly at the boundary of the uplink time slot for the Node B. The procedure for exactly aligning the arrival point of the uplink channel in the Node B is called a "time advance procedure". The transmission point of the UE controlled by the time advance procedure is applied to a transmission point of the uplink channel after the arrival point of the downlink channel received from the Node B. When the applied time is called "T", the T becomes a round trip delay value between the UE and the Node B. Therefore, the propagation delay value becomes T/2. The round trip delay value of the propagation delay value can be transmitted through a dedicated measurement report during communication through the DCH. The dedicated measurement report is transmitted to the SRNC. In the method for measuring the propagation delay value or the round trip delay value during communication through the DCH, the UE personally measures the propagation delay value.

In the WB-TDD CDMA mobile communication system, the SRNC measures the propagation delay value, and in the FDD CDMA mobile communication system, the Node B measures the propagation delay value. However, in the NB-TDD CDMA mobile communication system, the UE can personally measure the propagation delay value or the round trip delay value based on the information used in the time advance procedure. In addition, the SRNC requests the UE to report the propagation delay value or the round trip delay value using the dedicated measurement procedure, and at the request of the SRNC, the UE calculates the propagation delay value or the round trip delay value and reports a message including the calculated value to the SRNC through the dedicated measurement report.

The calculated round trip delay value can be used to determine transmission power when the SRNC transmits FACH data to the UE. That is, the SRNC informs the Node B of transmission power of FACH data, so that the Node B can transmit the FACH data to the UE at preferred transmission power. In addition, the round trip delay value can also be used in estimating a location of the UE. Further, the present invention provides a method for measuring the propagation delay value or the round trip delay value while the dedicated channel is established.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for measuring a propagation delay value of a frame transmitted by a UE (User Equipment) to a Node B in a TDD (Time Division Duplexing) mobile communication system including a frame divided into two sub-frames, each of the sub-frames having a plurality of time slots and also having a downlink pilot time slot and an uplink pilot time slot, both intervening between a first time slot and a second time slot of the plurality of time slots, the system also including the Node B for transmitting the frame fixed to a time axis, and the UE for transmitting a propagation-delayed frame in response to the frame received from the Node B, the method comprising the steps of:

acquiring synchronization with the Node B based on a downlink pilot channel signal transmitted in a period of the downlink pilot time slot, and determining an estimated round trip delay value T1 by comparing transmission power of a physical common channel signal in the first time slot with reception power of the physical common channel signal;

transmitting an uplink pilot channel signal by applying the estimated round trip delay value T1 to a desired transmission point of the uplink pilot channel signal;

receiving a transmission point correcting value T2 through a forward physical access channel (FPACH) signal transmitted from the Node B in a period of one downlink time slot among the time slots; and transmitting a physical random access channel (PRACH) message with the estimated round trip delay value T1 at a transmission point determined based on the transmission point correcting value T2 and the estimated round trip delay value T1, so that the PRACH message is received at the Node B at a start point of a period of one uplink time slot among the time slots.

2. The method as claimed in claim 1, wherein the transmission power of the physical common channel signal is determined based on system information provided through a broadcast channel in the physical common channel signal.

3. The method as claimed in claim 1, wherein the estimated round trip delay value T1 is determined based on a path loss determined by comparing the transmission power of the physical common channel signal with the reception power of the physical common channel signal.

4. The method as claimed in claim 1, wherein the desired transmission point of the uplink pilot channel signal is determined based on the acquired synchronization.

5. The method as claimed in claim 1, wherein the transmission point correcting value T2 is determined based on an offset between an arrival point of the uplink pilot time slot and a desired arrival point of the uplink pilot time slot.

6. The method as claimed in claim 5, wherein the desired arrival point is identical to a start point of a period of the uplink pilot time slot.

7. The method as claimed in claim 6, wherein the transmission point correcting value T2 is determined within a range of −96 chips to 32 chips.

8. The method as claimed in claim 7, wherein the −96 chips are determined considering a guard period existing between the downlink pilot time slot and the uplink pilot time slot.

9. The method as claimed in claim 1, wherein the transmission point of the PRACH message is determined by a sum of the estimated round trip delay value T1 and the transmission point correcting value T2.

10. A method for measuring a propagation delay value of a frame transmitted by a Node B to a UE (User Equipment)

in a TDD (Time Division Duplexing) mobile communication system including a frame divided into two sub-frames, each of the sub-frames having a plurality of downlink time slots, a plurality of uplink time slots, a downlink pilot time slot and an uplink pilot time slot, and further including the Node B for transmitting a physical common channel signal in a period of a first time slot of the sub-frame, and the UE for calculating an estimated round trip delay value T1 based on a path loss of the physical common channel signal and transmitting the uplink pilot time slot by applying the calculated round trip delay value T1, the method comprising the steps of:

determining a transmission point correcting value T2 based on an offset between an arrival point of an uplink pilot channel signal and a desired arrival point of the uplink pilot channel signal in the uplink pilot time slot period;

including the transmission point correcting value T2 in a forward physical access channel (FPACH) signal, and transmitting the PFACH signal to the UE in a period of one downlink time slot among the downlink time slots;

receiving a physical random access channel (PRACH) message with the estimated round trip delay value T1, transmitted from the UE at a transmission point determined based on the transmission point correcting value T2 and the estimated round trip delay value T1, in a period of one uplink time slot among the uplink time slots; and     transmitting the estimated round trip delay value T1 and the transmission point correcting value T2 included in the PRACH message to a radio network controller (RNC) to which the UE belongs, along with an RACH signaling message, so that the RNC determines a round trip delay between the Node B and the UE.

11. The method as claimed in claim 10, wherein the desired arrival point is identical to a start point of a period of the uplink pilot time slot.

12. The method as claimed in claim 10, wherein the transmission point correcting value T2 is determined within a range of −96 chips to 32 chips.

13. The method as claimed in claim 12, wherein the −96 chips are determined considering a guard period existing between the downlink pilot time slot and the uplink pilot time slot.

14. The method as claimed in claim 10, wherein the round trip delay value is determined by a sum of the estimated round trip delay value T1 and the transmission point correcting value T2.

15. A method for measuring a propagation delay value of a frame exchanged between a UE (User Equipment) and a Node B in a TDD (Time Division Duplexing) mobile communication system including a frame divided into two sub-frames, each of the sub-frames having a plurality of downlink time slots, a plurality of uplink time slots, a downlink pilot time slot and an uplink pilot time slot, and further including the Node B for transmitting a physical common channel signal in a period of a first time slot of the sub-frame, and the UE for calculating an estimated round trip delay value T1 based on a path loss of the physical common channel signal and transmitting the uplink pilot time slot by applying the calculated round trip delay value T1, the method comprising the steps of:

transmitting an uplink pilot channel signal from UE to the Node B at a transmission point determined by applying the estimated round trip delay value T1 to a desired transmission point of the uplink pilot channel signal;

determining by the Node B a transmission point correcting value T2 based on an offset between an arrival point of the uplink pilot channel signal and a desired arrival point of the uplink pilot channel signal;

transmitting the determined transmission point connecting value T2 from the Node B to the UE along with a forward physical access channel (FPACH) signal in a given downlink time slot period;

transmitting a physical random access channel (PRACH) message with the estimated round trip delay value T1 from the UE to the Node B at a transmission point determined based on the transmission point correcting value and the estimated round trip delay value T1 received through the FPACH signal;

receiving by the Node B the PRACH message at a start point of a given uplink time slot period; and     transmitting the estimated round trip delay value T1 and the transmission point correcting value T2 included in the received PRACH message from the Node B to a radio network controller (RNC) to which the UE belongs, along with a random access channel (RACH) signaling message, so that the RNC determines a round trip delay between the Node B and the UE.

16. The method as claimed in claim 15, wherein the desired transmission point of the uplink pilot channel signal is determined based on acquired synchronization.

17. The method as claimed in claim 15, wherein the desired arrival point of the uplink pilot channel signal is identical to a start point of a period of the uplink pilot time slot.

18. The method as claimed in claim 15, wherein the transmission point correcting value T2 is determined within a range of −96 chips to 32 chips.

19. The method as claimed in claim 18, wherein the −96 chips are determined considering a guard period existing between the downlink pilot time slot and the uplink pilot time slot.

20. The method as claimed in claim 15, wherein a transmission point of the physical random access channel (PRACH) message is determined by a sum of the estimated round trip delay value T1 and the transmission point correcting value T2.

21. An apparatus for measuring a propagation delay value of a frame exchanged between a UE (User Equipment) and a Node B in a TDD (Time Division Duplexing) mobile communication system including a frame divided into two sub-frames, each of the sub-frames having a plurality of downlink time slots, a plurality of uplink time slots, a downlink pilot time slot and an uplink pilot time slot, and further including the Node B for transmitting a physical common channel signal in a period of a first time slot of the sub-frame, and the UE for calculating an estimated round trip delay value T1 based on a path loss of the physical common channel signal and transmitting the uplink pilot time slot by applying the calculated round trip delay value T1, the apparatus comprising:

the UE for transmitting an uplink pilot channel signal at a transmission point determined by applying the estimated round trip delay value T1 to a desired transmission point of the uplink pilot channel signal, and transmitting a physical random access channel (PRACH) message with the estimated round trip value T1 at a transmission point determined based on the transmission point correcting value T2 and the estimated round trip delay value T1 received through a forward physical access channel (FPACH) signal;

the Node B for determining the transmission point correcting value T2 based on an offset between an arrival point of the uplink pilot channel signal and a desired arrival point of the uplink pilot channel signal, transmitting the determined transmission point correcting value T2 along with the FPACH signal in a given downlink time slot period, and transmitting the estimated round trip delay value T1 and the transmission point correcting value T2 included in the PRACH message received at a start point of a given uplink time slot period to a radio network controller (RNC) along with an RACH signaling frame; and the RNC for receiving the RACH signaling frame and determining a round trip delay between the UE and the Node B based on the estimated round trip delay value T1 and the transmission point correcting value T2 included in the received RACH signaling frame.

22. The apparatus as claimed in claim 21, wherein the desired transmission point of the uplink pilot channel signal is determined based on acquired synchronization.

23. The apparatus as claimed in claim 21, wherein the desired arrival point of the uplink pilot channel signal is identical to a start point of a period of the uplink pilot time slot.

24. The apparatus as claimed in claim 21, wherein the transmission point correcting value T2 is determined within a range of −96 chips to 32 chips.

25. The apparatus as claimed in claim 24, wherein the −96 chips are determined considering a guard period existing between the downlink pilot time slot and the uplink pilot time slot.

26. The apparatus as claimed in claim 21, wherein a transmission point of the physical random access channel (PRACH) message is determined by a sum of the estimated round trip delay value T1 and the transmission point correcting value T2.

* * * * *